United States Patent [19]

Binning et al.

[11] Patent Number: 4,869,833

[45] Date of Patent: * Sep. 26, 1989

[54] METHOD AND APPARATUS FOR CONTROLLED CHEMICAL REACTIONS

[75] Inventors: Jack E. Binning, Broomfield; Frances M. Ferraro, Westminster; Franklin B. Carlson, Broomfield, all of Colo.

[73] Assignee: VerTech Treatment Systems, Inc., Denver, Colo.

[*] Notice: The portion of the term of this patent subsequent to Jan. 26, 2005 has been disclaimed.

[21] Appl. No.: 125,651

[22] Filed: Nov. 27, 1987

Related U.S. Application Data

[63] Continuation of Ser. No. 847,965, Apr. 3, 1986, Pat. No. 4,721,575.

[51] Int. Cl.⁴ .............................................. C02F 1/72
[52] U.S. Cl. ..................................... 210/761; 210/766; 210/177; 210/180; 210/205; 422/202; 422/208; 422/235; 423/659
[58] Field of Search .................... 110/34, 100, 101; 210/758, 761, 177, 180, 181, 205, 766; 422/202, 203, 208, 235; 423/659

[56] References Cited

U.S. PATENT DOCUMENTS

| | | | |
|---|---|---|---|
| 1,213,143 | 1/1917 | Aylsworth | 422/202 |
| 3,183,277 | 5/1965 | Scherer et al. | 422/202 |
| 3,579,554 | 5/1971 | Boudreau | 210/758 |
| 3,783,936 | 1/1974 | Wisz | 165/101 |
| 3,844,948 | 10/1974 | Burke et al. | 210/177 |
| 3,864,254 | 2/1975 | Hess et al. | 210/761 |
| 4,165,360 | 8/1979 | Casper et al. | 422/202 |
| 4,176,061 | 11/1979 | Stopka | 210/205 |
| 4,177,240 | 12/1979 | Dal Bianco | 422/202 |
| 4,229,296 | 10/1980 | Wheaton et al. | 210/758 |
| 4,230,503 | 10/1980 | Hughes | 422/202 |
| 4,241,043 | 12/1980 | Hetzel | 422/202 |
| 4,384,959 | 5/1983 | Bauer et al. | 210/761 |
| 4,721,575 | 1/1988 | Binning | 210/761 |

FOREIGN PATENT DOCUMENTS 1476294 4/1967 France ................. 422/202

Primary Examiner—Peter Hruskoci
Attorney, Agent, or Firm—Dykema Gossett

[57] ABSTRACT

A method and apparatus for effecting accelerated chemical reactions at elevated temperatures and pressures including wet oxidation of materials in waste streams. An influent waste stream or first reactant is directed through a long tubular coil within a containment vessel with a second reactant being added to the influent. The flow rates for the gas and liquid components of the waste stream are set to cause plug or slug flow of the waste stream through the tubular coil. The curvature of the coil tends to induce a secondary flow in the liquid such that the liquid tends to travel in a spiral thereby providing more intimate mixing of the reactants; and the containment vessel may be partitioned to form a series of successive compartments to permit different temperature gradients to be applied to successive sections of the tubing coil across its length. Alternatively, a tube in tube construction for the tubular coil permits counter current heat exchange betwen the waste stream within the inner tube and the returning stream. Multiple injection and extraction points are provided along the path of the tubular coil to permit gas, liquid or solid reactants to be added or extracted as desired. The tubular coil provides an excellent environmental container for the reaction stream and is extremely suitable for temperature control to permit continuous heat input, autogenic operation and continuous heat extraction.

3 Claims, 3 Drawing Sheets

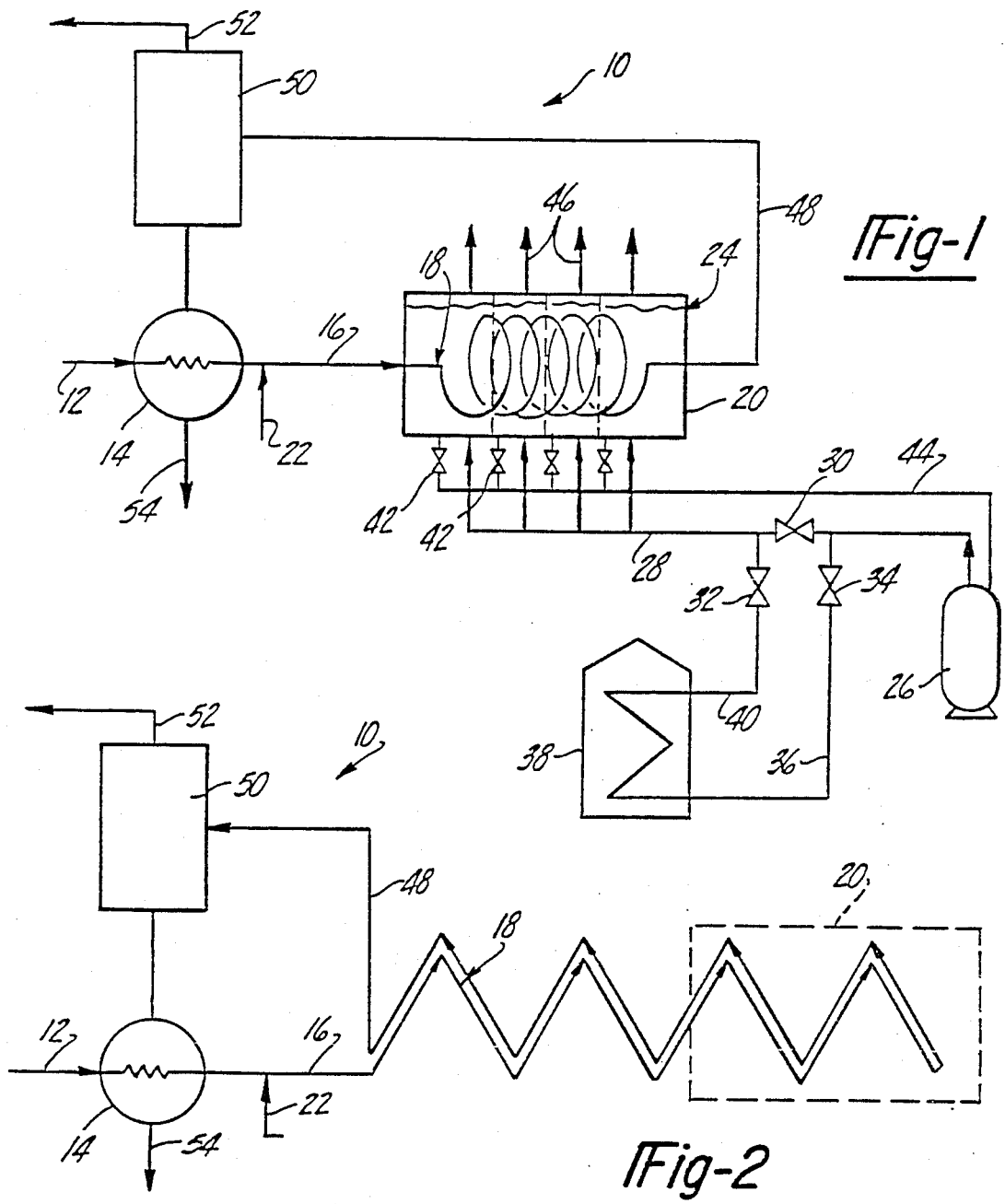
*Fig-1*
*Fig-2*
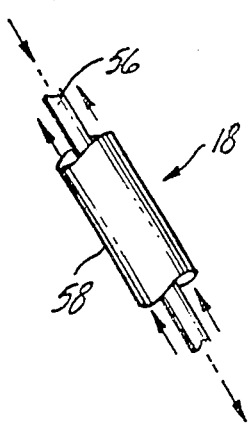
*Fig-3*

METHOD AND APPARATUS FOR CONTROLLED CHEMICAL REACTIONS

This is a continuation of application Ser. No. 847,965, filed Apr. 3, 1986 now U.S. Pat. No. 4,721,575.

BACKGROUND OF THE INVENTION

1. Field of the Invention

This invention relates to improvements in effecting chemical reactions, and more particularly, to an improved method and apparatus especially effective in carrying out wet oxidation of waste streams including sewage sludge.

2. Description of the Prior Art

Above ground wet oxidation systems have been in use for several years with limited success for the destruction of municipal sludge received from a sewage treatment process. The above-ground wet oxidation systems use high surface pressure and heat to initiate the wet oxidation reaction, however, the apparatus is not energy efficient, the system is subject to failure and results in only partial oxidation of the sludge; see, for example, Zimmermann U.S. Pat. No. 2,665,249 and Huesler et al. U.S. Pat. No. 2,932,613. The above ground wet oxidation processes have not, therefore, replaced the traditional methods of treating municipal sludge, which includes settling, dewatering, drying, incineration and the like.

Various vertical or down-hole fluid treatment systems have been proposed by the prior art but are used only in very limited applications. A down-hole fluid treatment system utilizes vertical pipes which generally extend downwardly into the ground from a control station. The fluid to be treated is pumped into the vertical reactor pipes and the fluid head creates a pressure which assists in the desired fluid process or reaction. In the processes used to date, the reaction requires additional heat which may be added by electrical resistance coils or heated fluid which circulates in a heat exchanger. Air or other gases may be added to the fluid being treated to assist in the reaction.

Although several prior art patents propose a vertical well wet oxidation reaction system for treatment of municipal sludge or other fluid waste streams, the processes and apparatus disclosed in these patents have not been successful; see, for example, U.S. Pat. No. 3,449,247. As recognized by these prior art patents, the pressure created by the fluid head is dependent upon the length of the reactor. Thus, it is theoretically possible to fully oxidize municipal sludge at a depth of approximately one mile provided the concentration of the oxidizable material in the municipal sludge is balanced against the oxygen available in the air injected into the system. To Applicants' knowledge, however, no one has been successful in building a down-hole wet oxidation system for municipal sludge except the Assignee of the present invention.

McGrew U.S. Pat. No. 4,272,383, assigned to the Assignee of the present invention, discloses the principles of the first successful down-hole wet oxidation reaction system for municipal sludge. The apparatus disclosed in the McGrew patent includes a series of generally concentric nested pipes or tubes wherein dilute organic waste is preferably received in the inner pipe and flows downwardly to a reaction zone adjacent the bottom of the pipe and recirculated upwardly through a second pipe, which surrounds the inner pipe, following the reaction. Compressed air or oxygen is injected into the downwardly flowing sludge preferably forming Taylor-type gas bubbles. In the McGrew patent, the temperature of the reaction is controlled by a heat exchanger jacket which surrounds the inner concentric pipes wherein heated oil or other heat exchange fluid is pumped into the jacket to control the temperature of the reaction zone.

The treatment apparatus of this invention provides a method and apparatus for effecting chemical reactions characterized by minimum initial capital costs, a relatively high overall thermodynamic efficiency, excellent containment and durability, and an overall simplicity of construction and operation with a minimum space requirement. Moreover, the present invention provides a novel ground surface method and apparatus for enhancing chemical reactions at high temperatures and pressures without the necessity of the customary large pressure vessels that require constant mechanical stirring and considerable land surface area. Further, the present invention solves a number of environmental, excessive energy, and maintenance problems presently associated with handling waste above ground.

SUMMARY OF THE INVENTION

The reaction system of the present invention for effecting accelerated chemical reactions includes as its basic component a long tubular coil within a containment vessel. An influent waste stream or first reactant is directed through the tubular coil with a second reactant being added to the influent waste stream. The reaction system may be used for wet oxidation of a waste influent consisting of dilute organic waste with air or pure oxygen being injected into the waste stream.

In one embodiment, the containment vessel is partitioned to form a series of successive compartments which are filled with a heat exchange fluid. The fluid in each compartment can be adjusted to different levels relative to the tubular coil which is submerged within the fluid. Further, the heat exchange fluid can be heated to a start-up temperature which will permit a chemical reaction to occur in the waste stream within the tubular coil. Alternatively, heat may be extracted from the heat exchange fluid after the reaction within the tubular coil becomes autogenic.

When processing dilute organic waste, for example, in the reaction system of the present invention, the influent liquid waste stream is pumped to the tubular coil at a pressure of approximately 1000–2000 psi with a gas such as air or oxygen being added thereto. The gas and liquid flow rates are set to cause plug or slug flow of the two phase waste stream through the tubular coil, thereby resulting in intimate mixing of the reactants. The reactants are heated within the coil to a temperature resulting in oxidition of the waste stream which is generally between 300° F. and 600° F. Thus, the reaction within the coil occurs under the combined conditions of high pressure, high temperature and two phase plug flow in the waste stream. The reaction system of this invention is, however, particularly suitable for destruction of toxic and industrial wastes, such as chlorinated hydrocarbons, cyanides, organic and inorganic phenols, polyaromatic compounds, etc. It will be understood, however, that the reaction system of this invention may also be used to treat various chemicals or solids suspended in a liquid where chemical oxidation reduction is not the principal object. The preferred temperature and pressure will, therefore, depend upon the intended reaction.

This system provides the advantage of a thin walled reaction container, i.e., the tubular coil, which, because of its coiled length, provides the necessary residence time for the reactants in the reaction zone to permit the desired amount of oxidation. The high temperature and high pressure conditions required for the reaction are contained within the thin walled tubing, which is unexpected since reactions of this type have normally been conducted within thick wall pressure vessels. As described more fully below, the diameter of the tube in a typical installation may be about two inches having a wall thickness of about one-quarter inch, wherein the reaction proceeds at a temperature of about 600° F. at a pressure of about 2000 psi and a flow rate of about five feet per second. This feature substantially lowers capital costs for the equipment and the system may be made portable.

Further, the plug or slug flow of the reactants through the tubular coil provides improved chemical reactant mixing because the curvature of the coil tends to induce a secondary flow in the liquid such that the liquid tends to travel in a spiral on the inside surfaces of the coils thereby providing more intimate mixing with the gaseous phase. The curvature of the spiral tube induces secondary flow in the fluid in the form of a double spiral and the gas phase, e.g. plug flow gaseous bubbles flows toward the "top" of the coil through upwardly extending coil portions and toward the "bottom" of the coil through downwardly extending coil portions, and wherein the gas slugs or plugs, e.g. disrupted plug flow gaseous bubbles are drawn through the generally horizontal tube portions at the top and bottom of the coil, thereby providing intimate and thorough mixing. Moreover, since the reaction container provided by the tubular coil is many times smaller in diameter as compared to known reaction vessels operating within the same pressure and temperature ranges, the performance of the oxidation process is improved since there is little possibility for the reactants to bypass the oxidation reaction and the improved containment of the reactants within the tubular coil minimizes the possibility of environmental problems.

The present invention also permits different temperature gradients to be applied to successive sections of the tubular coil across its length. In the compartmentalized embodiment of the containment vessel, the temperature of the heat exchange fluid in each compartment can be adjusted to provide a fine control of the rate of reaction occurring within each section of the tubular coil. Further, if a liquid heat exchange fluid is used, the level of the fluid in each compartment can be adjusted relative to the submerged coil which also affects the chemical reaction as a result of the gradient of external temperature acting upon the coil section in each compartment.

An alternate tube in tube design for the tubular coil permits the influent two phase waste stream to pass through the inner tube and return within the annulus formed between the outer periphery of the inner tube and the inner periphery of the outer concentric tube. This permits counter current heat exchange between the waste stream within the inner tube and the returning stream within the outer tube, and therefore, the heat exchange fluid within the containment vessel becomes unnecessary. This design is especially applicable for processing reactants at or near the autogenic operating point where heat input or removal is not required. The concentration of the reactants may be preset such that a certain amount of chemical reaction and heat release occurs as the waste stream travels within the inner tube. The chemical reaction would continue as the reactants return in the annulus between the tubes and the heat of reaction would heat any subsequent incoming waste stream through the inner tube. Moreover, the tube in tube design permits a ramped time temperature reaction rate as compared to the more step function type of reaction rate provided by the compartmentalized containment vessel.

The use of a long tubular coil as a reaction container allows the inclusion of multiple reactant injection or extraction points along the path of the coil. Gas, liquid or solid reactants may be added at multiple points along the length of the tubular coil and gas, liquid or solids may be extracted at various points. Multiple injection points permit fresh reactants to be added when, for example, the temperature of the waste stream has been heated by the reaction. Extraction of gaseous or solid reaction products at intermediate points along the length of the tubular coil can, for example, allow the reduction of the waste stream velocity downstream of the extraction point thereby increasing the residence time of the remaining reactants.

The tubular coil, which is approximately one mile in length, provides an excellent environmental container for the reaction stream under high pressure and temperature to prevent its escape to the atmosphere. Further, the long tubular coil is extremely suitable for temperature control to permit continuous heat input, autogenic operation, and continuous heat extraction. The heat exchange fluid surrounding the tubular coil within the containment vessel may include vapor, liquid or gaseous heat exchange fluids. Moreover, the start-up heat that is required for providing the reaction temperature can be conveniently provided through direct steam injection into the tubular coil. The tubular coil and, more particularly, the tube in tube and the multiple injection point design permit autogenic operation without the need for heat input or extraction since the temperature control may be achieved by varying the concentration of the reactants.

Other advantages and meritorious features of this invention will be more fully understood from the following description of the invention, the appended claims, and the description of the drawings which follows.

DESCRIPTION OF THE DRAWINGS

FIG. 1 is a schematic illustration of the reaction system of the present invention including a compartmentalized containment vessel.

FIG. 2 is a schematic illustration of the reaction system including a tube in tube design for the tubular coil.

FIG. 3 is a partial perspective view of the tube in tube configuration for the tubular coil.

DETAILED DESCRIPTION OF THE INVENTION

Figure 4:
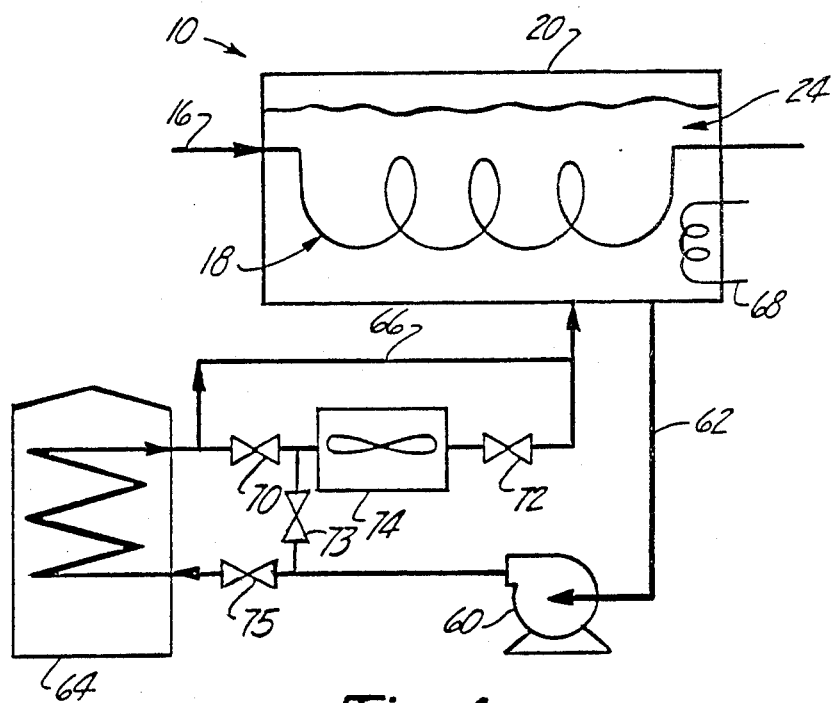
FIG. 4 is a schematic illustration of the reaction system wherein the heat exchange fluid is contained under pressure inside the containment vessel.

A schematic illustration of the above ground reaction system 10 of the present invention is shown in FIG. 1. An influent waste stream or first reactant is directed through conduit 12, heat interchanger 14, and conduit 16 to a long tubular coil 18 within containment vessel 20. A second reactant may be added to the influent waste stream through conduit 22. If it is desired to use reaction system 10 for wet oxidation of a waste influent consisting of dilute organic waste, air or pure oxygen would typically be injected into the waste stream through conduit 22.

As shown in FIG. 1, containment vessel 20 is partitioned to form a series of successive compartments which are substantially filled with a heat exchange fluid 24. Fluid 24 is pumped from reservoir 26 through conduit 28 into the individual compartments of vessel 20. By closing valve 30 in conduit 28 and opening valves 32 and 34, fluid 24 is directed through conduit 36 to a heat exchanger 38 where it is heated to a start-up temperature which will permit a reaction to occur in the waste stream within tubular coil 18. The heated fluid 24 leaves heat exchanger 38 through conduit 40 and is returned to vessel 20 through conduit 28. Alternatively, it may be necessary to extract heat from fluid 24 after the reaction within tubular coil 18 becomes autogenic. If so, fluid 24 may be circulated through heat exchanger inserted into conduit 44 for cooling it to the desired temperature.

The level of fluid 24 within each compartment of vessel 20 may be selectively controlled by operating any one of the valves 42 to permit the draining of fluid 24 through conduit 44 to reservoir 26. Further, if fluid 24 reaches a boiling temperature, pressurized vapor may be released through any one of the pressure relief lines 46 or the vapor may be circulated to a condensor for return to the system.

While the heat exchange fluid 24 disclosed in FIG. 1 is a liquid, a gaseous or vapor heat exchange fluid may also be utilized. If a gaseous heat exchange fluid is used, a fan or blower would be connected to the system at the location of reservoir 26.

After the waste stream has been reacted within tubular coil 18, it passes through conduit 48 to separator 50 where the vapor effluent exits through conduit 52 and the liquid effluent exits through conduit 54 to interchanger 14. As the liquid effluent passes through exchanger 14, its temperature is used to heat or cool the waste stream influent also passing therethrough.

When processing dilute organic waste in reaction system 10, the influent liquid waste stream is pumped to tubular coil 18 at a pressure of approximately 1200-2000 psi with a gas such as air or oxygen being added through conduit 22. The gas and liquid flow rates are set to cause plug or slug flow of the two phase waste stream through tubular coil 18, thereby resulting in intimate mixing of the reactants. The reactants are heated within coil 18 to a temperature resulting in oxidation of the waste stream which is generally between 300° F. and 600° F. Thus, the reaction within coil 18 occurs under the combined conditions of high pressure, high temperature, and two phase plug flow in the waste stream.

This system provides the advantage of a thin walled reaction container, i.e., the tubing coil 18, which, because of its coiled length, provides the necessary residence time for the reactants in the reaction zone to permit the desired amount of oxidation. The high temperature and high pressure conditions required for the reaction are contained within the thin walled tubing, which is unexpected since reactions of this type have normally been conducted within pressure vessels having very thick walls. This feature substantially lowers capital costs for the equipment. Further, the plug or slug flow of the reactants through the tubing coil or reaction container 18 provides improved chemical reactant mixing because the curvature of the coil tends to induce a secondary flow in the liquid such that the liquid tends to travel in a spiral on the inside surfaces of the coils thereby providing more intimate mixing with the gaseous phase. Moreover, since the reaction container provided by tubing coil 18 is many times smaller in diameter as compared to known reaction vessels operating within the same pressure and temperature ranges, the performance of the oxidation process is improved since there is little possibility for the reactants to bypass the oxidation reaction.

As will be understood from the fluid dynamics of the disclosed reaction system, the concurrent flow of liquid, gas and solids at velocity sufficient to assure slug or plug flow will provide intimate mixing of the constituents, which is important in chemical reactions such as wet oxidation. At low to moderate velocities, bubble flow is succeeded by churn flow. At higher mass flows, the flows become slug and plug flow, respectively. In the most preferred method and apparatus of this invention, the fluid and suspended solids are separated by separate and distinct plugs of gas which induces back mixing and provides more intimate, pulsing contact between the liquid and gaseous phases. Further, plug flow occurs at a greater velocity. A bend or curvature in the tube acts to separate the phases. A bend can cause a coalescence of bubbles to form plugs and can separate entrained droplets in annular flow. The curvature of the coil in the preferred embodiment also induces secondary flow in the fluid in the form of a double spiral. As described, the liquid is entrained in the flow on the inside surface. The preferred horizontal coil in plug flow thus provides thorough and intimate contact between the liquid and gas phases while permitting relatively high velocities. Therefore, the curvature of the tube induces flow such that the gas phase, e.g., plug flow gaseous bubbles, flow toward the "top" of the coil through upwardly extending coil portions and toward the "bottom" of the coil through downwardly extending coil portions and wherein gas slugs or plugs, e.g., disrupted plug flow gaseous bubbles, are drawn through the generally horizontal tube portions at the top and bottom of the coil, thereby providing intimate and thorough mixing.

As described, the reaction coil is preferably thin walled. In the pressurized above-ground reaction vessels disclosed in the prior art, the pressurized vessel has a wall thickness of about six inches to withstand the reaction pressure and the changes in the pressure in the vessel. The diameter of the reaction vessel may be six to ten feet in diameter to make a batch-type reaction commercially feasible. By way of example, the tubular coil reaction vessel of this invention may have a diameter of about two inches, accommodating a flow of one to eight feet per second at a pressure of about 2000 pounds per square inch at 550° F. It will be understood that the inside tube diameter may be one inch or less and range to about six inches while maintaining the preferred plug or slug flow. In a typical reaction, the gas phase is about 30% by volume, the reaction temperature is about 500°-600° F. and the pressure is about 2000 psi. Seamless nickel or titanium alloy steels are preferred for the tubing. For example, a nickel alloy seamless tube having an outside diameter of 2.375 inches has an inside diameter of 1.8 inches or a wall thickness of 0.287 inches. A plug flow will be maintained in this tube at the specified temperatures and pressures at a flow rate of between 1.5 and 8 feet per second.

Referring again to FIG. 1, the present invention permits different temperature gradients to be applied to successive sections of tubing coil 18 across its length. Since containment vessel 20 is compartmentalized, the temperature of the heat exchange fluid 24 in each compartment can be adjusted upwardly or downwardly as desired. This permits a fine control of the rate of reaction occurring within each section of tubing coil 18. Further, the fluid 24 in each compartment can be adjusted to different levels relative to the submerged coil 18 which also effects the chemical reaction rate as a result of the changes in the gradient of external temperature acting upon the coil section in each compartment.

FIGS. 2 and 3 illustrate an alternate tube in tube design for the tubing coil 18 consisting of two generally concentric tubes 56 and 58. In order to permit counter current flow of the waste stream, the end of tube 56 (i.e., the right hand end of tube 56 as viewed in FIG. 2) is spaced inwardly from the end of tube 58, which is closed. The influent two-phase waste stream passes through the inner tube 56 and returns within the annulus formed between the outer periphery of inner tube 56 and the inner periphery of outer concentric or surrounding tube 58. This permits counter current heat exchange between the waste stream within tube 56 and the returning stream within tube 58, and therefore, the heat exchange fluid 24 would be unnecessary. This design is especially applicable for processing reactants at or near the autogenic operating point where heat input or removal is not required within containment vessel 20. For example, the concentration of the reactants passing through the inner tube 56 may be preset such that a predetermined amount of chemical reaction and heating from the reaction occurs during the time it takes the waste stream to reach the end of tube 56. The chemical reaction would then continue as the reactants return in the annulus between tubes 56 and 58, thereby permitting the heat of reaction in the returning waste stream to be transmitted for heating the incoming waste stream through tube 56. Further, the tube in tube design permits a ramped time temperature reaction rate as compared to the more step function type of reaction rate provided by the compartmentalized containment vessel, which was described in connection with FIG. 1.

Referring now to FIG. 4, the containment vessel 20 is again illustrated with tubing coil 18 therein. Coil 18 is immersed in heat exchange fluid 24 as before, but fluid 24 is contained under pressure inside vessel 20. To start the process in operation, a pump 60 delivers fluid 24 through conduit 62 to heater 64 which is then returned through conduit 66 in a heated state to containment vessel 20. Alternatively, a heating coil 68 or jacket or direct steam injection can be used to raise the temperature of fluid 24. After the reaction system is running autogenically by virtue of the heat produced within tubing coil 18 from the reactants, it is not necessary to use either heater 64 or heater coil 68. In fact, it may be necessary to remove heat from fluid 24 by closing valves 70 and 75 and opening valves 72 and 73 and pumping fluid 24 through a cooler 74 and returning the cooled fluid back to vessel 20.

Figure 5:
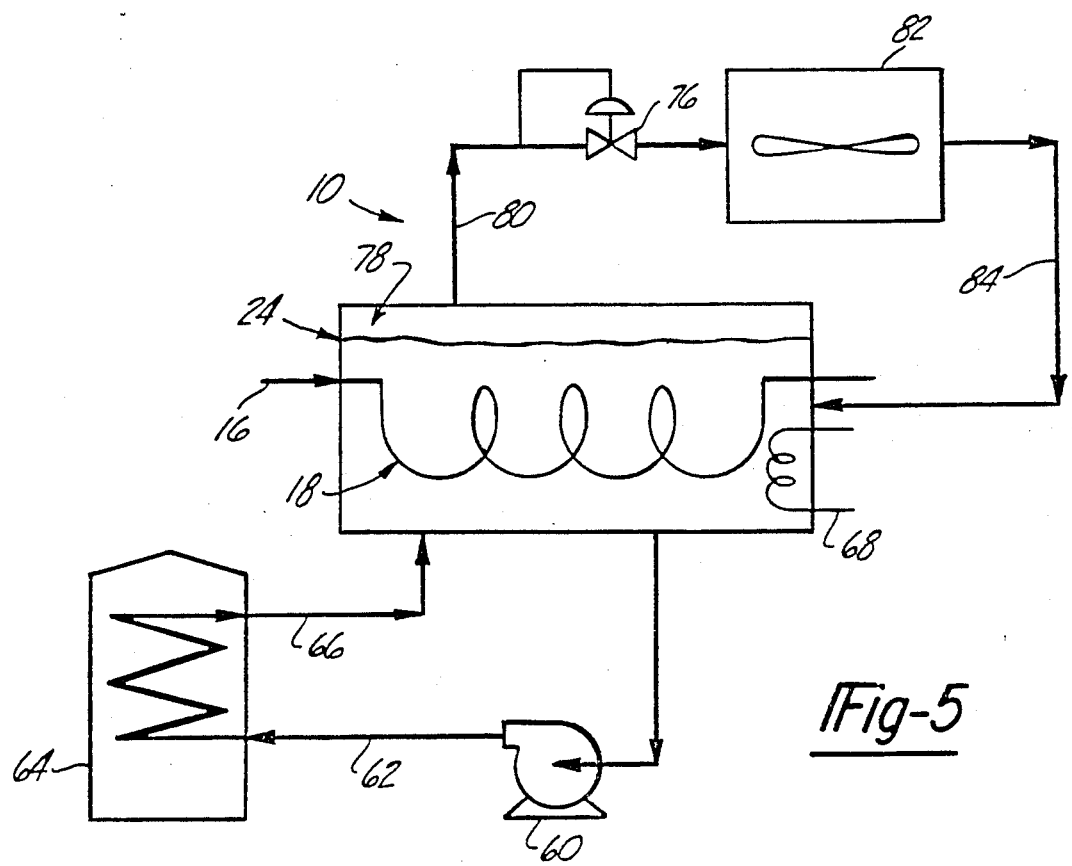
FIG. 5 is a schematic illustration of the reaction system including a pressure control to establish the pressure of the vapor space above the heat exchange fluid within the containment vessel.

In FIG. 5, a pressure control valve 76 is used to establish the pressure of the vapor space 78 above fluid 24 in containment vessel 20. The heat of reaction of the reactants in tubing coil 18 will produce boiling in fluid 24 adding to the pressure of the vapor held above it in space 78. When the pressure is excessive, valve 76 will release excess vapor through conduit 80 to condenser 82 and condensed fluid will return through conduit 84 to vessel 20.

Figure 6:
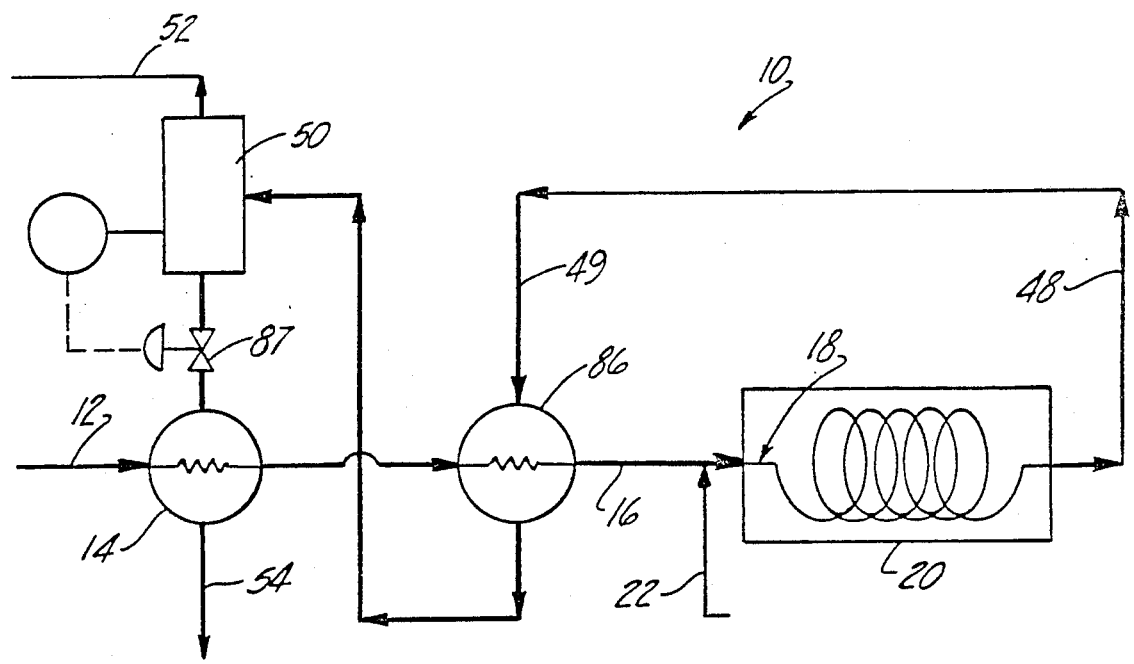
FIG. 6 is a schematic illustration of the addition of a condenser or interchanger to permit an interchange of temperature between the effluent stream and the influent stream.

FIG. 6 shows the reaction system 10 having the addition of condenser or interchanger 86 such that there is an interchange of temperature between the effluent stream and influent stream through conduits 48 and 16, respectively. This permits the use of a smaller vapor treatment system since the amount of water vapor in the vapor effluent stream is reduced. Also, since the temperature of the liquid in conduit 49 is reduced, it will substantially reduce the size and cost of separator 50, valve 87 and heat exchanger 14.

Figure 7:
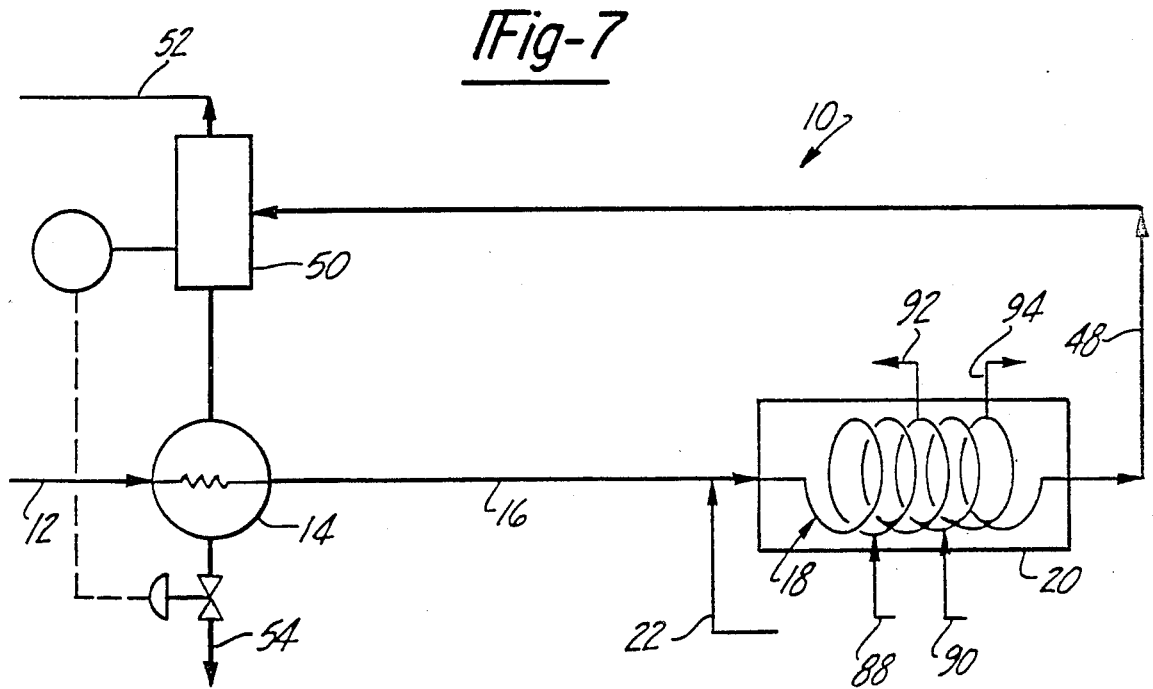
FIG. 7 is a schematic illustration of the reaction system including multiple reactant injection or extraction points along the path of the tubular coil.

As shown in FIG. 7, the use of a long tubular coil 18 as a reaction container allows the inclusion of multiple reactant injection or extraction points along the path of the tubular coil. Gas, liquid, or solid reactants may be added at multiple points along the length of the tubular coil 18 such as at injection points 88 and 90. Moreover, gas, liquid or solids may be extracted at various points such as 92 and 94. Multiple injection points permit fresh reactants to be added when, for example, the temperature of the waste stream has been heated by the reaction, thereby improving the overall reaction performance and capacity. Extraction of gaseous or solid reaction products at intermediate points along the length of the tubular coil will, for example, allow the reduction of the waste stream velocity downstream of the extraction point, thereby increasing the residence time of the remaining reactants.

The tubular coil 18, which is approximately one mile in length, provides an excellent container for the reaction stream under high pressure and temperature to prevent its escape to the atmosphere. Further, the long tubular coil is extremely suitable for temperature control, as described, to permit continuous heat input, autogenic operation, and continuous heat extraction. The heat exchange fluid surrounding the tubular coil 18 within containment vessel 20 may include vapor, liquid or gaseous heat exchange fluids. Moreover, the start-up heat required for providing the reaction temperature can be conveniently provided through direct steam injection into tubular coil 18. Steam injection may be done before the entrance of the reactants into tubing coil 18. The tubular coil 18, and more particularly, the tube in tube design of FIGS. 2-3, or the multiple injection/extraction design of FIG. 7, permits autogenic operation without the need for heat input or extraction since the temperature control may be achieved by varying the concentration of the reactants.

Having described the present invention, it will be understood that various modifications may be made to the invention disclosed herein within the purview of the appended claims.

We claim:

1. In a method of effecting chemical reactions in a thin walled tubular coil arranged generally around a horizontal axis, said coil having generally upwardly and downwardly extending tube portions and generally horizontal intermediate tube portions, said method comprising the following steps:
(a) flowing a liquid influent stream having a first reactant into said coil under a predetermined pressure;
(b) flowing a gaseous influent having a second reactant into said coil under a predetermined pressure;
(c) controlling the feed and flow rates of said liquid and gaseous influents at said predetermined pressures to produce generally two phase plug or slug flow of said gaseous and liquid influents through said coil, including plug flow gaseous bubbles flowing upwardly through said liquid influent in said upwardly extending coil portions, plus flow gaseous bubbles flowing downwardly through said liquid influent in said downwardly extending coil portions, and disrupted plug flow gaseous bubbles in said intermediate generally horizontal tube portions, thereby providing intimate mixing of the gaseous and liquid influents; and
(d) heating said influents to initiate a chemical reaction of said reactants in said coil and controlling the temperature of said influents within said tubular coil by using a heat exchange medium circulated in contact with said tubular coil for heating said reactants to initiate an exothermic chemical reaction of said reactants in said coil and removing heat from said reactants when said chemical reaction becomes autogenic.

2. In a method of effecting chemical reactions the steps of:
flowing an influent fluid stream containing reactants through a long thin-walled tubular coil horizontally positioned, said step of flowing being controlled to provide a selected flow rate to cause plug or slug flow of said influent fluid stream through said coil;
circulating a heat exchange medium in contact with said tubular coil;
controlling the temperature of the fluid stream within said tubular coil with said heat exchange medium by adding heat to said fluid stream when the temperature of the fluid is below a predetermined temperature and removing heat from said fluid stream when the temperature of the fluid is above a predetermined temperature wherein a chemical reaction of said reactants in the fluid stream occurs to form an effluent fluid stream and reaction products; and
flowing the effluent fluid stream and reaction products from said tubular coil.

3. In an apparatus for effecting chemical reactions comprising:
a long thin-walled tubular coil horizontally positioned for flowing an influent fluid stream containing reactants therethrough at a selected flow rate to cause plug or slug flow of the influent fluid stream through said coil;
means including a heat exchange medium which is circulated in contact with said tubular coil for controlling the temperature of the fluid stream within said tubular coil to add heat when the temperature of the fluid stream is below a predetermined temperature and to remove heat when the temperature of the fluid stream is above a predetermined temperature wherein a chemical reaction within the fluid stream occurs resulting in an effluent of fluid and reaction products; and
means for receiving the fluid and reaction product effluent from said tubular coil.

* * * * *